US008148951B2

(12) United States Patent
Saito (10) Patent No.: US 8,148,951 B2
(45) Date of Patent: Apr. 3, 2012

(54) BATTERY CONTROLLING APPARATUS FOR A VEHICLE

(75) Inventor: Jun Saito, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 167 days.

(21) Appl. No.: 12/523,004

(22) PCT Filed: Mar. 4, 2008

(86) PCT No.: PCT/JP2008/053842
§ 371 (c)(1),
(2), (4) Date: Aug. 7, 2009

(87) PCT Pub. No.: WO2009/034728
PCT Pub. Date: Mar. 19, 2009

(65) Prior Publication Data
US 2010/0164438 A1 Jul. 1, 2010

(30) Foreign Application Priority Data
Sep. 14, 2007 (JP) ................................ 2007-240005

(51) Int. Cl.
*H02J 7/04* (2006.01)
*H02J 7/00* (2006.01)
(52) U.S. Cl. ........................................ 320/155; 320/135
(58) Field of Classification Search .................. 320/157, 320/155, 152
See application file for complete search history.

(56) References Cited

U.S. PATENT DOCUMENTS

| 5,606,240 A | 2/1997 | Kokuga et al. |
| 5,726,555 A | 3/1998 | Takamoro |
| 6,686,724 B2 * | 2/2004 | Coates et al. ................ 320/135 |
| 6,856,866 B2 * | 2/2005 | Nakao ............................. 701/22 |

FOREIGN PATENT DOCUMENTS

| JP | 6-038392 A | 2/1994 |
| JP | 7-123602 A | 5/1995 |
| JP | 8-298728 A | 11/1996 |
| JP | 10-42483 A | 2/1998 |
| JP | 11-89105 A | 3/1999 |
| JP | 3774995 B2 | 3/2006 |

* cited by examiner

*Primary Examiner* — M'Baye Diao
(74) *Attorney, Agent, or Firm* — Birch, Stewart, Kolasch & Birch, LLP (57) ABSTRACT

A battery controlling apparatus for a vehicle and effectively prevents overcharge upon battery charging with a simple configuration is provided.
The battery controlling apparatus for a vehicle includes a charging ratio detection section 1b for detecting a charging ratio of a battery 4 upon starting of constant current control, an elapsed time measurement section 2a for measuring elapsed time from a point of time at which the constant current control starts, a timeout setting section 2c for setting timeout time of the constant current control based on the charging ratio detected by the charging ratio detection section 1b, and a current cutoff section 2d for cutting off current to be supplied to the battery 4 when the elapsed time measured by the elapsed time measurement section 2a, upon the constant current control, exceeds the timeout time set by the timeout setting section 2c.

10 Claims, 8 Drawing Sheets

Calculation of offset time T_off

BATTERY CONTROLLING APPARATUS FOR A VEHICLE

FIELD OF THE INVENTION

The present invention relates to a battery controlling apparatus for controlling charging of a battery incorporated in a vehicle such as a hybrid car, an electric car or the like.

DESCRIPTION OF THE RELATED ART

Conventionally, as a charging technique for a battery, various charging methods such as constant-current charge, constant-voltage charge, constant-current and constant-voltage charge and so forth have been developed. The constant-current charge is a method for carrying out charge with usually fixed current. Principally this constant-current charge is used for charge control of a nickel-cadmium battery or a nickel-hydrogen battery. On the other hand, the constant-voltage charge is a method of applying a constant voltage to a battery to carry out charge. Although this method exhibits a higher charging efficiency than the constant-current charge, excessively high current is supplied at an initial stage of charge, and this is not preferable from a point of view of control management.

Figure 8:
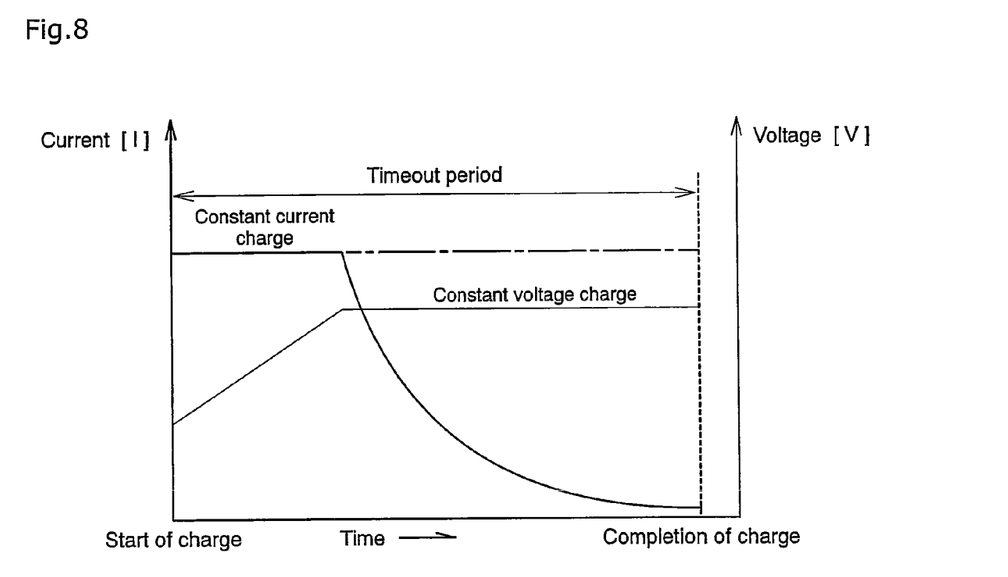
FIG. 8 is a graph illustrating aged deterioration of the current and the voltage in the constant-current and constant-voltage charge according to the conventional technique.

Therefore, a charging method wherein the charging methods described above are combined such that the constant-current charge is carried out for a period of time until the voltage of the battery reaches a predetermined voltage and then the charging method is changed over to the constant-voltage charge is the constant current and constant-voltage charge. The constant current and constant-voltage charge is widely utilized as a high-speed and stabilized charging method for a lithium-ion based battery. Variation with time of the current and the voltage where the charging method just described is used is illustrated in FIG. 8. It is to be noted that there is a tendency that, if a high current value is set upon the constant-current charge, then the time until the voltage of the battery reaches a predetermined voltage becomes short and the overall charging time is reduced. A method which utilizes such a charging characteristic as just described to carryout the constant-current and constant-voltage charge at a higher speed is boost charge.

Incidentally, in such constant-current and constant-voltage charging control as described above, the time after charge is started until it is completed is called timeout time. The length of the timeout time is usually set in response to the SOC (charge state, charging rate) upon starting of the charge of the battery. Also a charging method has been proposed wherein the timeout time is set in response to a charge and discharge characteristic of a battery grasped in advance.

Patent Document 1 discloses a charging method for a lithium ion secondary battery wherein the charging time is set in response to an ambient temperature detected upon starting of charging. According to this technique, as the ambient temperature becomes higher, the charging time is reduced, while as the ambient temperature becomes lower, the charting time is extended. By such a configuration as just described, an optimum charge amount is assured in accordance with the charging environment.

Patent Document 1: Japanese Patent No. 3,774,995

DISCLOSURE OF THE INVENTION

Subject to be Solved by the Invention

However, in such conventional charging control which depends upon the timeout time as described above, overcharge of a battery cannot sometimes be avoided completely. For example, if the changeover from the constant-current charge to the constant-voltage charge is not carried out because of a fault of a charger and high current continues to be supplied to the battery as indicated by an alternate long and short dash line in FIG. 8, the state wherein the battery voltage or the battery temperature is excessively high continues for a period of time until after the timeout time elapses. Therefore, the conventional charge control has a subject that there is the possibility that the battery may suffer from degradation or performance deterioration.

The present invention has been made in view of such a subject as just described, and it is an object of the present invention to provide a battery controlling apparatus for a vehicle which can effectively prevent overcharge upon charging of a battery with a simple configuration.

Means for Solving the Subject

According to the present invention, there is provided a battery controlling apparatus for a vehicle for carrying out constant current control for charging a battery incorporated in a vehicle to a predetermined voltage with fixed current and thereafter carrying out constant voltage control for charging the battery while maintaining the predetermined voltage and reducing the current, comprising an SOC calculation section adapted to calculate a charging rate of the battery upon starting of the constant current control, an elapsed time measurement section adapted to measure elapsed time from starting time of the constant current control, a timeout setting section adapted to set a timeout period of the constant current control based on the charging rate detected by the charging rate detection section, and a current cutoff section adapted to cut off the current to be supplied to the battery when the elapsed time measured by the elapsed time measurement section upon the constant current control exceeds the timeout period set by the timeout setting section.

It is to be noted that the battery controlling apparatus carries out the constant-current charge and the constant-voltage charge and is suitable for use as a battery controlling apparatus for a lithium-ion battery charger. Further, the timeout time of the constant current control signifies time from a point of time of starting of charging to a point of time at which the constant current control ends (that is, until the constant voltage control starts).

Further, according to the present invention, the battery controlling apparatus for a vehicle is characterized in that the timeout setting section calculates a period by subtracting offset time set based on a current value in the constant current control from maximum charging time set based on the charging rate, and sets the period as the timeout period.

It is to be noted that the offset time is set shorter as the current decreases. Since the magnitude of the current in the constant current control decreases as the charging rate increases, the offset time decreases in accordance with the progress of the charge. Accordingly, the difference between the charging time and the timeout time reduces as the charging time approaches the maximum charging time.

Further, according to the present invention, the battery controlling apparatus for a vehicle is characterized in that the timeout setting section calculates a period by adding predetermined time set in advance to estimated time from a point of time of the starting of the constant current control to another point of time at which the voltage of the battery reaches the predetermined voltage, and sets the period as the timeout period.

It is to be noted that preferably the predetermined time is set in advance in response to the specifications of the battery.

Further, according to the present invention, the battery controlling apparatus for a vehicle is characterized in that the timeout setting section extends the timeout period in response to the current value upon the constant voltage control, and the current cutoff section cuts off the current to be supplied to the battery when the elapsed time measured by the elapsed time measurement section upon the constant voltage control exceeds the timeout period extended by the timeout setting section.

In other words, the timeout setting section sets the timeout time which is different among different current values. In particular, the timeout setting section re-sets the timeout time so as to be longer as the current reduces in the constant voltage control.

Further, according to the present invention, the battery controlling apparatus for a vehicle is characterized in that it further comprises a battery temperature detection section adapted to detect temperature of the battery upon starting of the charging, and the timeout setting section corrects the timeout period in response to the temperature detected by the battery temperature detection section.

It is to be noted that the timeout setting section extends the timeout time as the temperature becomes low while reducing the timeout time as the temperature becomes high.

Effect of the Invention

With the battery controlling apparatus for a vehicle of the present invention, even in a case wherein changeover from the constant current control to the constant voltage control is not carried out because of a failure of a battery charger or the like and the constant current is continuously supplied to the battery, the current can be cut off to prevent overcharge. Further, since first timeout time set by the timeout setting section is not maximum charging time which signifies completion of charge but timeout time within which the constant-current charge can be permitted, a failure of a battery charger or the like which occurs before completion of the charge can be found out. Particularly, overcharge upon boost charge wherein the constant-current charge is carried out with high current at an initial stage of the charging can be effectively prevented and the durability of the battery can be enhanced.

Further, with the battery controlling apparatus for a vehicle of the present invention, since maximum charging time at which the charging is predicted to be completed is set and the timeout time is set to time before the maximum charging time, the charge controlling characteristic can be enhanced by the two kinds of time settings which make references for the control.

Further, with the battery controlling apparatus for a vehicle of the present invention, since the timeout time is set longer by predetermined time than time at which the constant current control is estimated to end, a failure in the changeover from the constant current control to the constant voltage control can be grasped with certainty. Further, where such a failure as described above does not occur, a trouble does not occur with the changeover from the constant-current charge to the constant-voltage charge.

Further, with the battery controlling apparatus for a vehicle of the present invention, since the timeout time is extended in response to the magnitude of the current in the constant voltage control, overcharge can be prevented only in a case wherein a battery charger or the like fails without obstructing the suitable constant voltage control.

Further, with the battery controlling apparatus for a vehicle of the present invention, the charge control can be carried out accurately taking the battery temperature upon charging starting into consideration and a failure of a battery charger or the like can be decided accurately.

DESCRIPTION OF REFERENCE CHARACTERS

1 BMU (battery management unit)
1a charging method selection section
1b SOC calculation section
1c charger controlling section
2 EVECU (main ECU)
2a elapsed time measurement section (elapsed time measurement section)
2b maximum charging time calculation section
2c timeout setting section (timeout setting section)
2d contactor controlling section (current cutout section)
3 sensor
3a battery temperature sensor (battery temperature detection section)
3b ammeter
3c voltmeter
4 battery
5 on-vehicle charger
6, 7 contactor
8 auxiliary battery
10 electric car

DETAILED DESCRIPTION OF THE INVENTION

Figure 1:
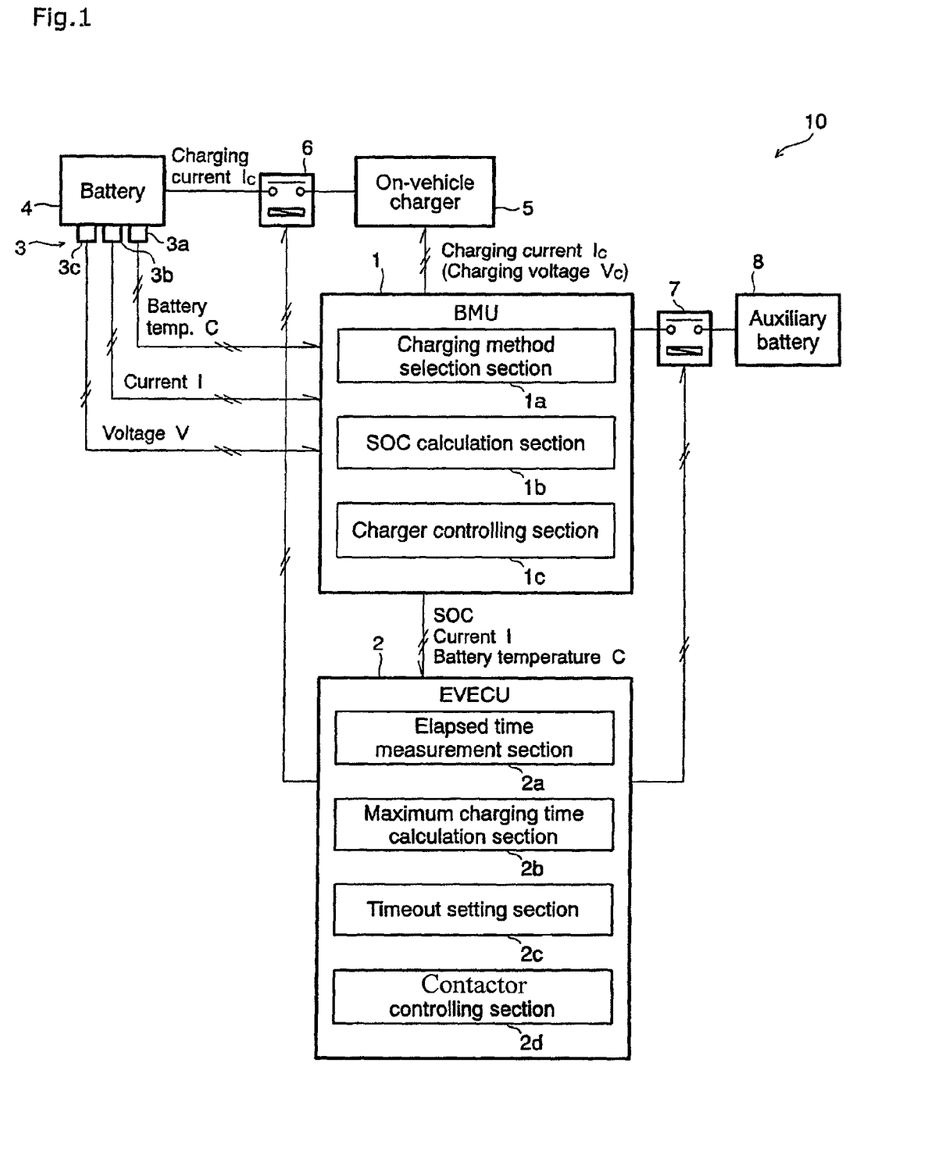
FIG. 1 is a block diagram showing a general configuration of a battery controlling apparatus for a vehicle according to an embodiment of the present invention.
Figure 2:
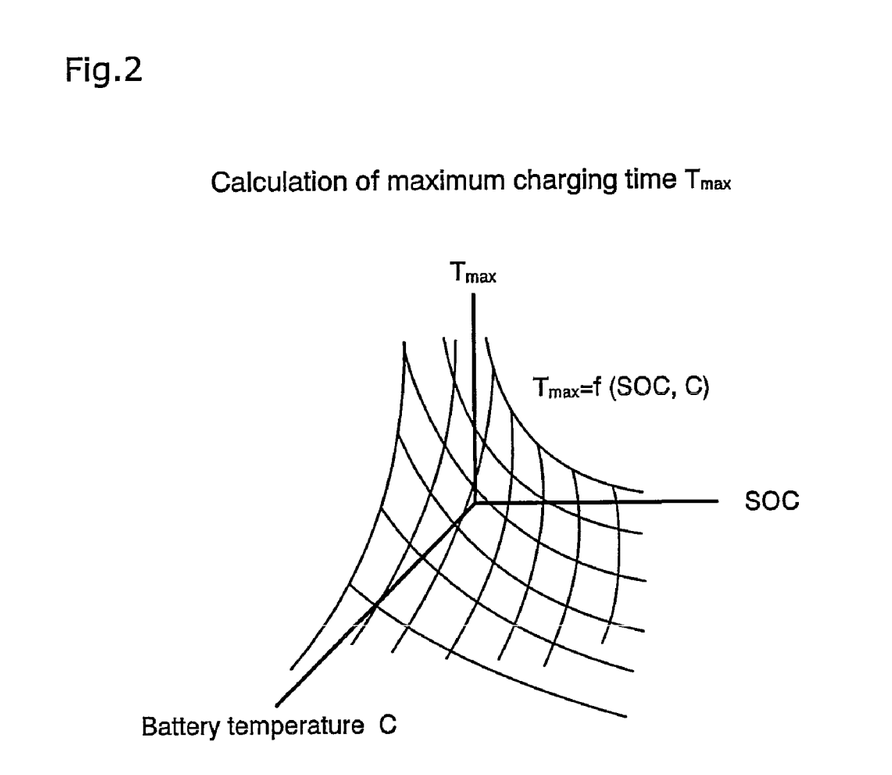
FIG. 2 is a graph illustrating a relationship of maximum charging time to a battery temperature and an SOC in the battery controlling apparatus for a vehicle according to the embodiment of the present invention.
Figure 3:
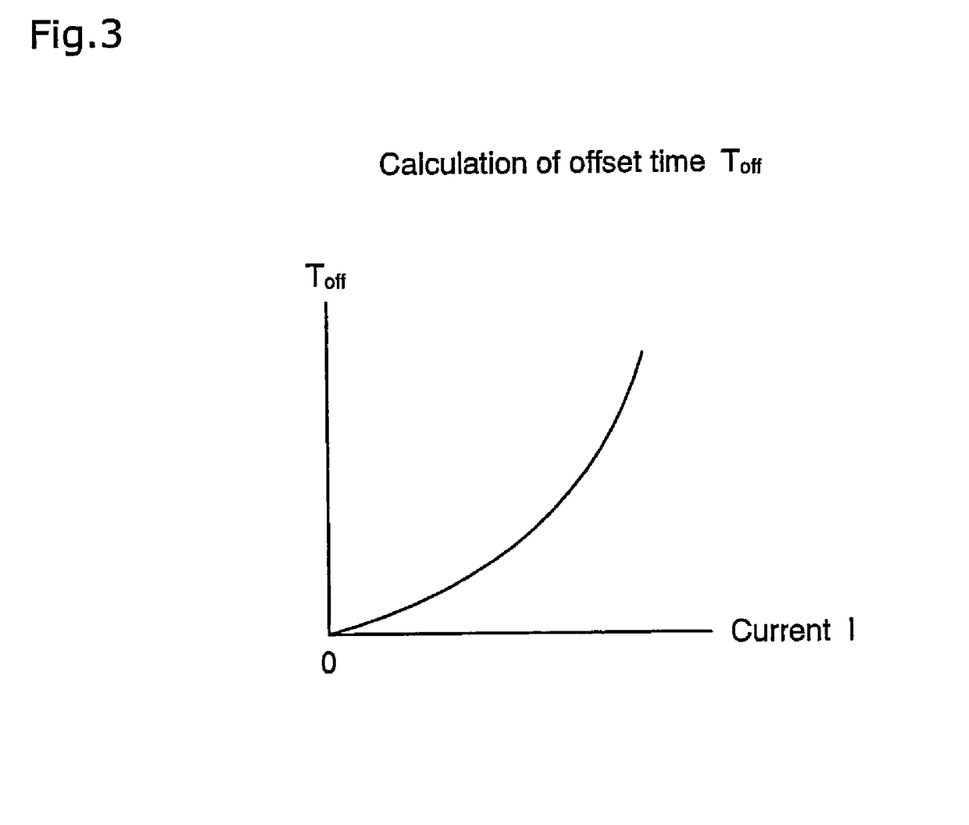
FIG. 3 is a graph illustrating a relationship between offset time and current in the battery controlling apparatus for a vehicle according to the embodiment of the present invention.
Figure 4:
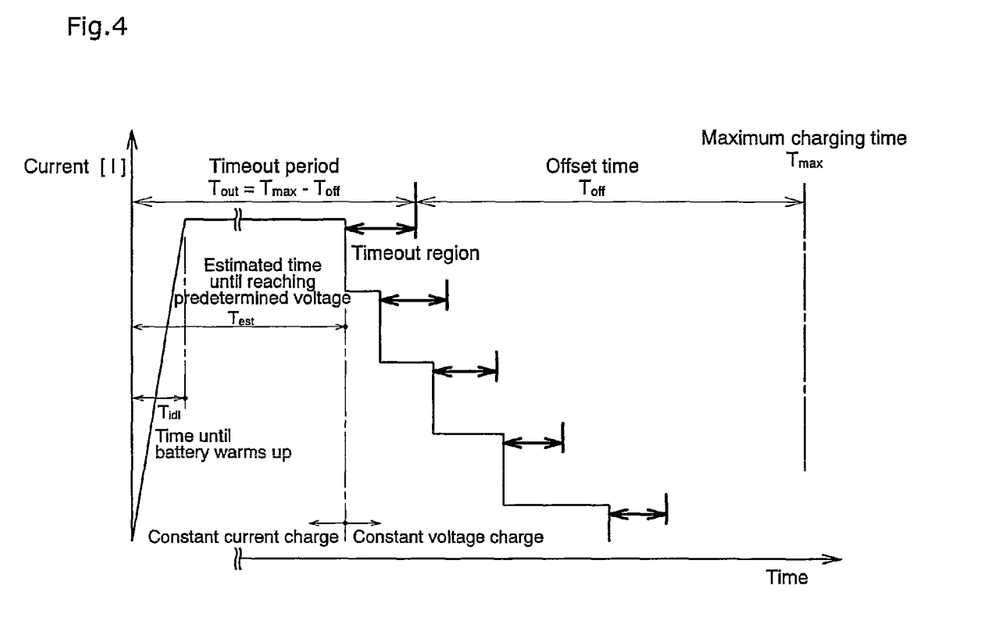
FIG. 4 is a graph illustrating contents of control by the battery controlling apparatus for a vehicle according to the embodiment of the present invention.
Figure 5:
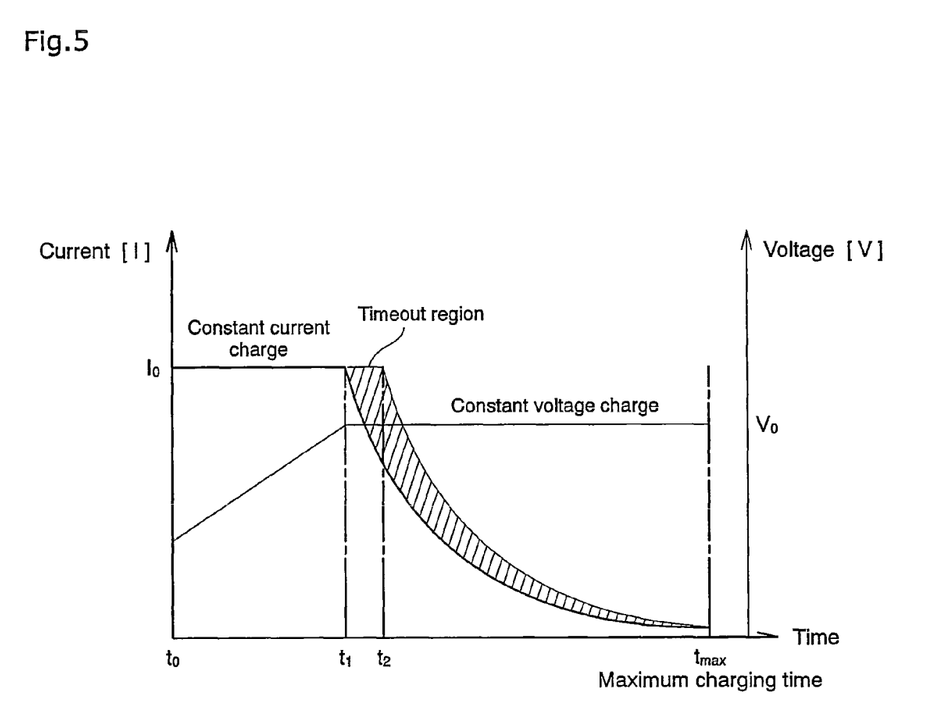
FIG. 5 is a graph illustrating aged deterioration of the current and the voltage in the charge control by the battery controlling apparatus for a vehicle according to the embodiment of the present invention.
Figure 6:
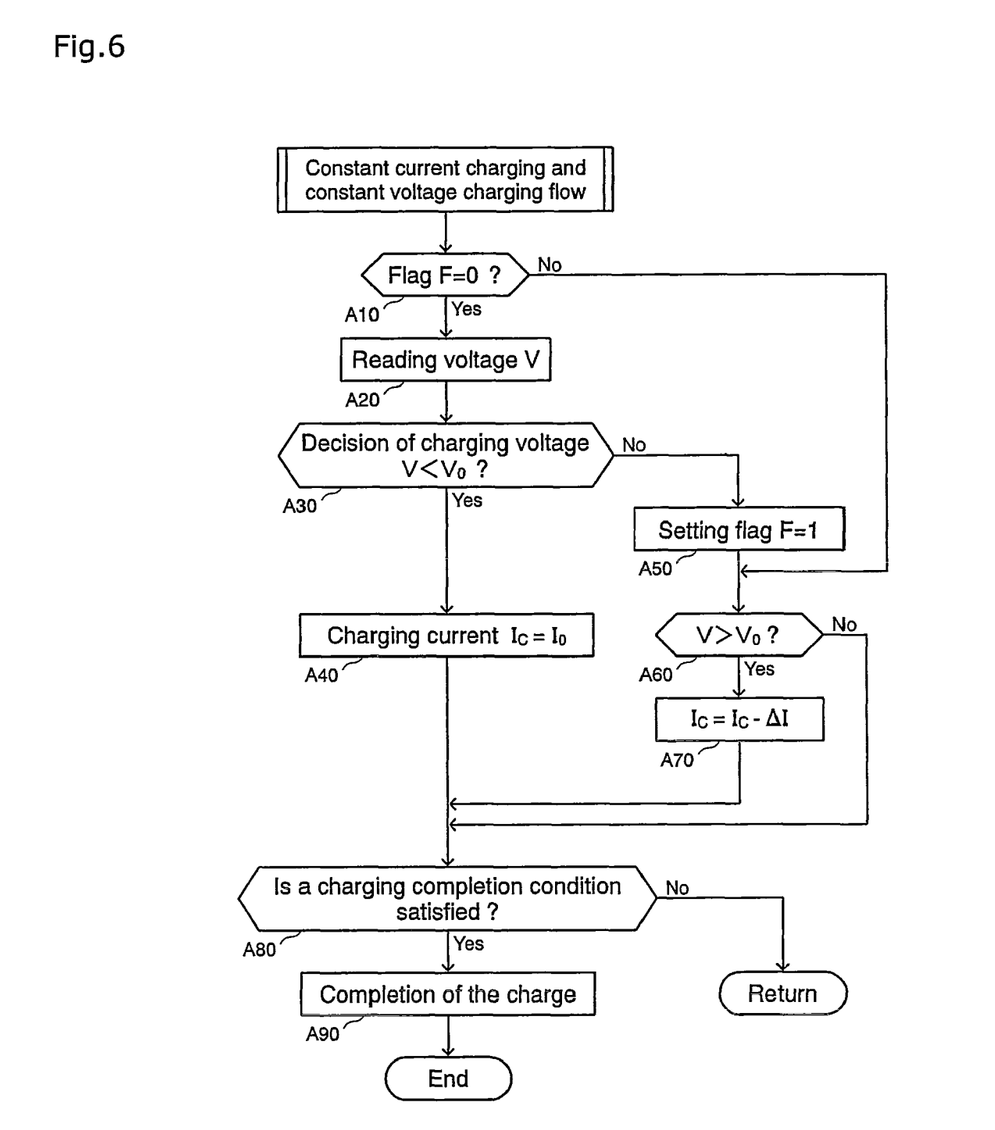
FIG. 6 is a flowchart illustrating a controlling procedure by the battery controlling apparatus for a vehicle according to the embodiment of the present invention.
Figure 7:
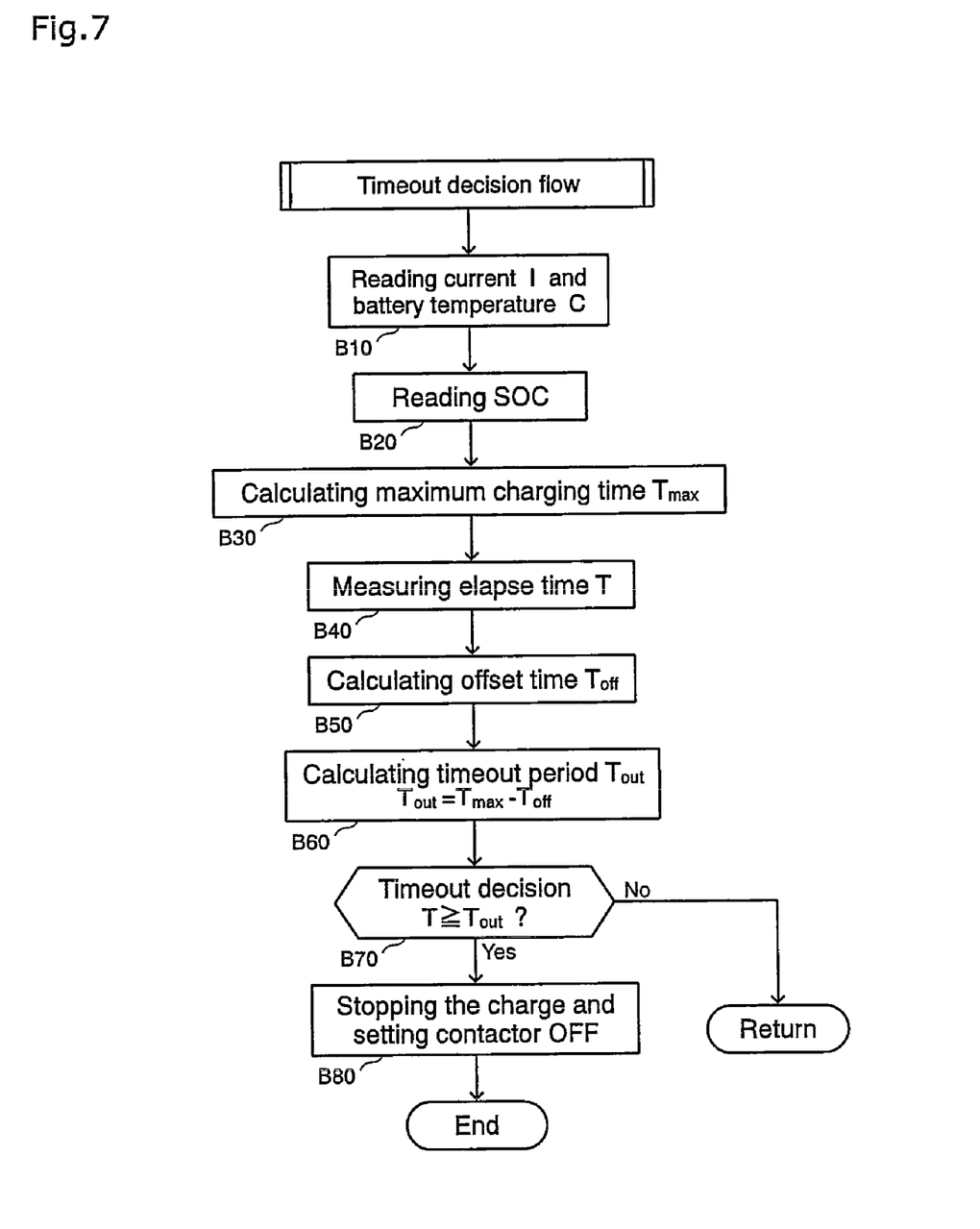
FIG. 7 is a flow chart illustrating another controlling procedure by the battery controlling apparatus for a vehicle according to the embodiment of the present invention.

In the following, an embodiment of the present invention is described with reference to the drawings. FIGS. 1 to 7 are views illustrating a battery controlling apparatus for a vehicle according to an embodiment of the present invention. FIG. 1 is a block diagram showing a general configuration of the battery controlling apparatus. FIG. 2 is a graph illustrating a relationship of maximum charging time to a battery temperature and an SOC in the battery controlling apparatus. FIG. 3 is a graph illustrating a relationship between offset time and current in the battery controlling apparatus. FIG. 4 is a graph illustrating contents of control by the battery controlling apparatus. FIG. 5 is a graph illustrating aged deterioration of the current and the voltage in the charge control by the battery controlling apparatus. FIGS. 6 and 7 are flow charts showing a controlling procedure by the battery controlling apparatus.

[General Configuration]

The battery controlling apparatus of the present embodiment is applied to an electric car 10 shown in FIG. 1 and includes a BMU (battery management unit) 1, an EVECU (main ECU) 2, a sensor 3, a battery 4, an on-vehicle charger 5, contactors 6 and 7, and an auxiliary battery 8.

The battery 4 is a main power supply of the electric car 10 and is formed from a plurality of lithium-ion battery modules connected in series. Meanwhile, the on-vehicle charger 5 is a charger for charging the battery 4 with electric power supplied from a household power supply and is connected to the battery 4 through the contactor 6 on a charging line. Charging current $I_c$ supplied from the on-vehicle charger 5 is controlled by the BMU 1. It is to be noted that the contactor 6 is a relay apparatus for connecting and disconnecting the charging line between the on-vehicle charger 5 and the battery 4.

The BMU 1 is an electronic controlling apparatus formed from a microcomputer and is provided as an LSI device in which a well-known microprocessor, a ROM, a RAM and so forth are integrated.

This EMU 1 carries out the constant-current and constant-voltage charge by instructing the on-vehicle charger 5 of the magnitude of the charging current $I_c$. For example, the BMU 1 causes the on-vehicle charger 5 to supply fixed current $I_0$ as the charging current $I_c$ to the battery 4 at an initial stage of the charge to carry out the constant-current charge. Then, after the voltage V of the battery 4 reaches a predetermined voltage $V_0$, the BMU 1 causes the on-vehicle charger 5 to carry out the constant-voltage control of gradually decreasing the charging current $I_c$ so that the predetermined voltage $V_0$ may be maintained. It is to be noted that, where a constant-voltage circuit is built in the on-vehicle charger 5, in the constant-voltage control, the BMU 1 may be configured so as to instruct the on-vehicle charger 5 of a charge voltage $V_c$ in place of instructing the on-vehicle charger 5 of charging current $I_c$.

The sensor 3 is a sensor for detecting a charged state of the battery 4 and is formed from a battery temperature sensor (battery temperature detection section) 3a for detecting the temperature C [° C.] of the electrolyte of the battery 4, an ammeter 3b and a voltmeter 3c. The ammeter 3b detects the current I [A] between the terminals of the battery 4 upon charge and upon discharge, and the voltmeter 3c detects the voltage V [A] between the terminals of the battery 4. It is to be noted that the cycles in which the ammeter 3b and the voltmeter 3c detect the current I and the voltage V, respectively, are kept in synchronism with each other. Consequently, the current I and the voltage V at the same time can be grasped. The detection information by the sensors 3 is inputted to the BMU 1 and utilized for feedback in the constant-current and constant-voltage control.

Further, the BMU 1 operates with the power supplied from the auxiliary battery 8. The contactor 7 is interposed on the power supply line (12 V line) between the BMU 1 and the auxiliary battery 8. The contactor 7 is a relay apparatus for connecting and disconnecting the power supply line between the BMU 1 and the auxiliary battery 8.

The EVECU 2 is an ECU (electronic controlling unit) of a higher order than the BMU 1 and monitors the operation of the BMU 1 to control the connection and disconnection of the contactors 6 and 7. It is to be noted that also the EVECU 2 is an electronic controlling apparatus formed from a microcomputer similarly to the BMU 1, and is provided as an LSI device on which a well-known microprocessor, a ROM, a RAM and so forth are integrated.

[BMU]

As shown in FIG. 1, the BMU 1 includes a charging method selection section 1a, an SOC calculation section (charging rate detection section) 1b and a charger controlling section 1c.

The charging method selection section 1a detects the charged stage of the battery 4 based on the voltage V detected by the voltmeter 3c to select a charging method. In particular, where the voltage V is lower than the predetermined voltage $V_0$ set in advance, the charging method selection section 1a selects the constant-current charge, but where the voltage V is equal to or higher than the predetermined voltage, the charging method selection section 1a selects the constant-voltage charge. The charging method selected here is transmitted to the charger controlling section 1c.

The SOC calculation section 1b calculates the SOC [%] of the battery 4 using a publicly known estimation method based on the detection information by the sensors 3. For example, based on the current I and the voltage V upon the discharge, the discharge amount till a point of time of starting of the charge from the fully charged state is integrated in advance, and an SOC corresponding to the discharge amount is calculated. Or, an SOC may be calculated based on the internal resistance value or the open voltage of the battery 4 calculated upon the discharge. Or, a different configuration may be used wherein an estimated value of the SOC is corrected in response to a battery temperature C. The battery temperature C and the SOC calculated here are transmitted to the EVECU 2.

The charger controlling section 1c instructs the on-vehicle charger 5 of the magnitude of the charging current $I_c$ to control the on-vehicle charger 5 in accordance with the charging method selected by the charging method selection section 1a. First, in a charging initial state wherein the constant-current charge is selected, the charger controlling section 1c controls the on-vehicle charger 5 to charge the battery 4 so that predetermined current $I_0$ set in advance may be supplied. On the other hand, in a state wherein the constant-voltage charge is selected after the voltage V of the battery 4 reaches the predetermined voltage $V_0$, the charger controlling section 1c carries out such control as to gradually decrease the charging current $I_c$ so that the predetermined voltage $V_0$ may be maintained. In this manner, the BMU 1 carries out popular constant-current and constant-voltage charge. It is to be noted that the value of the current I detected by the ammeter 3b is transmitted to the EVECU 2 through the BMU 1.

Further, if a predetermined charging completion condition set in advance is satisfied, then the charger controlling section 1c ends the control of the constant-current and constant-voltage charge. The predetermined completion condition may be, for example, that the charging current $I_c$ upon the constant-voltage charge becomes zero or that maximum charging time $T_{max}$ hereinafter described elapses after the starting of the charge.

[EVECU]

As shown in FIG. 1, the EVECU 2 includes an elapsed time measurement section (elapsed time measurement section) 2a, a maximum charging time calculation section 2b, a timeout setting section (timeout time setting section) 2c and a contactor controlling section (current cutoff section) 2d.

The elapsed time measurement section 2a measures elapsed time T from the starting of the charge. Here, the elapsed time T from the point of time at which the constant-current charge by the charger controlling section 1c of the BMU 1 is started is measured.

The maximum charging time calculation section 2b calculates the maximum charging time $T_{max}$ based on the SOC calculated by the SOC calculation section 1b and the battery temperature C detected by the battery temperature sensor 3a. The maximum charging time $T_{max}$ is time until the charge is completed upon normal charge control, estimated from the SOC upon the starting of the charge. As shown in a graph in FIG. 2, the maximum charging time $T_{max}$ is a function of the SOC and the battery temperature C and is set so as to be longer as the SOC becomes lower or as the battery temperature C becomes lower.

The timeout setting section 2c subtracts offset time $T_{off}$ from the maximum charging time $T_{max}$ calculated by the maximum charging time calculation section 2b to set timeout time $T_{out}$ as illustrated in FIG. 4.

The offset time $T_{off}$ is time set in response to the current I during charge and is set so as to be shorter as the current I decreases as indicated by a graph in FIG. 3.

Meanwhile, the timeout time $T_{out}$ signifies time within which continuation of the charge can be permitted in the constant-current and constant-voltage charge and is set shorter than the maximum charging time $T_{max}$. While the maximum charging time $T_{max}$ of the battery 4 is a fixed value corresponding to the SOC and the battery temperature C in every charging operation, the timeout time $T_{out}$ varies in response to the variation of the current I during the charge.

It is to be noted that, since the current I upon the constant-current charge is fixed (predetermined current $I_0$) irrespective of the SOC of the battery 4, the offset time $T_{off}$ does not vary during the constant-current charge. Accordingly, in the constant-current charge control, the timeout time $T_{out}$ has a fixed value corresponding to the SOC and the battery temperature C, and after the succeeding constant-voltage charge control is entered, the timeout time $T_{out}$ is extended.

The contactor controlling section 2d stops the charge to cut off the charging current $I_0$ to be supplied to the battery 4 when time longer than the timeout time $T_{out}$ elapses after the charge is started elapses. Here, the contactor controlling section 2d controls the contactors 6 and 7 so as to cut off the charging line and the power supply line when the elapsed time T measured by the elapsed time measurement section 2a is equal to or longer than the timeout time $T_{out}$. On the other hand, where the elapsed time T is shorter than the timeout time $T_{out}$, the contactor controlling section 2d controls the contactors 6 and 7 so that the state wherein the charging line and the power supply line are connected is continued.

Variation with time of the current and the voltage where normal constant-current and constant-voltage control is carried out is illustrated in FIG. 5. In the present battery controlling apparatus, variation of the current within a timeout region indicated by slanting lines in FIG. 5 is permitted. Meanwhile, if the variation of the current exceeds this timeout region, then the charge is stopped. It can be recognized that the timeout time $T_{out}$ at which the charge is stopped decreases as the current I increases.

[Flow Chart]

A control procedure by the present battery controlling apparatus is described with reference to FIGS. 6 and 7. FIG. 6 is a flow chart for carrying out the constant-current and constant-voltage control and is executed on demand in the BMU 1 after charge is started. Meanwhile, FIG. 7 is a flow chart for deciding the timeout time and is executed suitably in the EVECU 2 subordinately to the flow chart of FIG. 6.

[Constant-Current and Constant-Voltage Charging Flow]

In the constant-current and constant-voltage charging flow of FIG. 6, a flag F indicative of whether the charging method carried out at the current point of time is the constant-current charge or the constant-voltage charge. Where F=0 in a state wherein the charge is carried out by the on-vehicle charger 5, it is determined that the constant-current charge is currently carried out, but where F=1, it is determined that the constant-voltage charge is currently carried out. The initial value of the flag F is 0.

At step A10, it is determined whether or not the flag F is F=0. Here, if F=0, then the processing advances to step A20, but if F≠0 (that is, F=1), then the processing advances to step A60. Here, the type of the charge being carried out is determined.

If the processing advances to step A20, then the voltage V of the battery 4 detected by the voltmeter 3c is read into the BMU 1, and then at step A30, it is determined by the charging method selection section 1a whether or not the voltage V is lower than the predetermined voltage $V_0$. At this step, the changeover condition from the constant-current charge to the constant-voltage charge is decided. Here, if V<$V_0$, then the processing advances to step A40, at which the charger controlling section 1c sets the value of the charging current $I_c$ to be supplied to the battery to the predetermined current $I_0$ and carries out the constant-current charge. Thereafter, the processing advances to step A80.

On the other hand, if V≧$V_0$ at step A30, then the processing advances to step A50, at which the flag F is set to F=1, and then, control of the constant-voltage charge is carried out at steps beginning with the step A60. First, at step A60, it is determined by the charger controlling section 1c whether or not the voltage V is higher than the predetermined voltage $V_0$. Here, if V>$V_0$, then the processing advances to step A70, at which the charger controlling section 1c decrements the charging current $I_c$ by a very small amount ΔI, whereafter the processing advances to step A80.

On the other hand, if V≦$V_0$ at step A60, then the processing advances directly to step A80 while the charging current $I_c$ is not varied. In particular, once the voltage V becomes equal to or higher than the predetermined voltage $V_0$ after the charge is started, the charging current $I_c$ is decreased so that the voltage V of the predetermined voltage $V_0$ may be maintained. It is to be noted that the magnitude of the very small amount ΔI is set suitably in response to the carrying out cycle of the present flow or the follow-up speed of the voltage V to the predetermined voltage $V_0$.

At step A80, it is determined whether not the predetermined charge completion condition is satisfied, and if the charge completion condition is not satisfied, then the flow described above is repeated. On the other hand, if the charge completion condition is satisfied, then the processing advances to step S90, at which the EVECU 2 controls the on-vehicle charger 5 to stop the outputting of the charging current $I_c$ to complete the charge.

[Timeout Decision Flow]

The timeout decision flow of FIG. 7 is described. This flow is carried out as one of decisions of the charge completion condition at step A80 in the constant-current and constant-voltage charging flow illustrated in FIG. 6.

First at step B10, the battery temperature C and the current I detected by the sensors 3 are read into the EVECU 2. Then at step B20, the SOC calculated by the SOC calculation section 1b of the BMU 1 is read into the EVECU 2. Then at step B30, the maximum changing time calculation section 2b calculates the maximum charging time $T_{max}$ based on the SOC and the battery temperature C of the battery 4. The maximum charging time $T_{max}$ may be calculated once in one charging operation, and when the present flow is repeated in the second and succeeding operations, the steps B20 and B30 may be omitted.

At next step B40, the elapsed time measurement section 2a measures the elapsed time T after the starting of the charge. Further at step B50, the timeout setting section 2c sets offset time $T_{off}$ corresponding to the current I detected by the ammeter 3b. Then at step B60, the offset time $T_{off}$ is subtracted from the maximum charging time $T_{max}$, to calculate the timeout time $T_{out}$.

The offset time $T_{off}$ is set at step B50 in response to the value of the current I every time this flow is carried out repetitively. Also the timeout time $T_{out}$ is updated in response to the value of the current I. In particular, upon the constant-current charge, since the current I does not vary, the timeout time $T_{out}$ does not vary. However, upon the constant-voltage charge, as the current I decreases, the timeout time $T_{out}$ is extended.

Then at step B70, the contactor controlling section 2d determines whether or not the elapsed time T after the starting of the charge is equal to or longer than the timeout time $T_{out}$. Here, if $T \leq T_{out}$, then the processing advances to step B80, at which the charge is stopped and the contactors 6 and 7 are cut off, and the present flow is ended. On the other hand, if $T<T_{out}$, then this flow is ended. In short, in this instance, the charge is continued.

[Working-Effect]

Variation with time of the current I and the voltage V of the battery 4 where the charge of the battery 4 is started at time $t_0$ is illustrated in FIG. 5. First in an initial state of the charge, the predetermined current $I_0$ set in advance is supplied from the on-vehicle charger 5 to carry out the constant-current control. On the other hand, when the voltage V gradually rises until it reaches the predetermined voltage $V_0$ at time $t_1$, the constant-voltage charge is carried out, and the charging current $I_c$ is gradually decreased so as to maintain the predetermined voltage $V_0$.

Here, if the changeover from the constant-current charge to the constant-voltage charge is not carried out by some fault of the on-vehicle charger 5, then the predetermined current $I_0$ continues to be supplied to the battery 4 also after time $t_1$, resulting in the possibility of overcharge. However, in the present battery controlling apparatus, if the current variation exceeds the timeout region indicated by slanting lines in FIG. 5, then the contactors 6 and 7 are cut off to stop the charge. In short, when the predetermined current $I_0$ continues to be supplied, the charging control is stopped at time $t_2$. Accordingly, a failure or the like of the charger with which it occurs before completion of the charge can be found out, and overcharge into the battery 4 can be prevented. Particularly, overcharge upon the constant-current charge with comparatively high current upon boost charge or the like can be prevented effectively.

Further, since the timeout time $T_{out}$ is set longer by a predetermined time length than time $t_1$ at which the constant-current control is estimated to come to an end, a fault in the changeover from the constant-current control to the constant-voltage control can be grasped with certainty. Further, if such a fault does not occur, then no trouble occurs with the changeover from the constant-current charge to the constant-voltage charge.

Further, since such a timeout region as described above is set with reference to the maximum charging time $T_{max}$ and the timeout time $T_{out}$ is extended in response to the magnitude of the current I, normal control upon the constant-voltage charge is not disturbed, and appropriate failsafe control ready for a case wherein a charger fails can be achieved. For example, if the constant-voltage control later than time $t_1$ can be carried out appropriately, since the current variation remains in the timeout region, the charge can be completed at a point of time at which the maximum charging time $T_{max}$ elapses.

Further, since the maximum charging time $T_{max}$ with which the charge is estimated to be completed is set first and then the timeout time $T_{out}$ is set to time prior to the maximum charge time, the charge control characteristic can be improved by the two kinds of time settings used as a reference for the control.

It is to be noted that, since the maximum charging time $T_{max}$ is set as a function of the SOC and the battery temperature C, charge control with the battery temperature C taken into consideration can be carried out, and a failure of the charger or the like can be determined accurately.

In this manner, with the present battery controlling apparatus, overcharge upon the charge of the battery 4 can be prevented effectively with a simple configuration.

[Others]

While an embodiment of the present invention has been described, the present invention is not limited to the embodiment and can be carried out in various modified forms without departing from the subject matter of the present invention.

For example, while, in the embodiment described above, the EVECU 2 is configured so as to cut off the contactors 6 and 7 upon stopping of the charge at step B80 of the timeout decision flow, the configuration may be replaced by another configuration wherein one of the contactors is cut off.

Further, while, in the embodiment described above, the BMU 1 which principally takes charge of the control of the on-vehicle charger 5 and the EVECU 2 which takes charge of the control of the contactor 6 are provided as separate electronic controlling apparatus, naturally the functions of them may be integrated into a single electronic controlling apparatus.

Further, while, in the embodiment described above, the timeout setting section 2c sets the timeout time $T_{out}$ by subtracting the offset time $T_{off}$ from the maximum charging time $T_{max}$, it may otherwise be configured such that the width of the timeout region is set to a magnitude corresponding to the value of the current I. For example, as shown in FIG. 4, estimated time $T_{est}$ after the point of time at which the constant-current control is started until the voltage V of the battery in the constant-current control reaches the predetermined voltage $V_0$ is calculated in advance. Further, the timeout setting section 2c sets time obtained by addition of predetermined time set in advance to the estimated time $T_{est}$ as the timeout time $T_{out}$. It is to be noted that the estimated time $T_{est}$ may be calculated from the current $I_0$ upon the constant-current charge, the SOC of the battery 4 and so forth. This makes it possible to carry out control similar to that in the embodiment described hereinabove.

It is to be noted that, as shown in FIG. 4, where the battery temperature C upon starting of the chart is a low temperature, since the charging current $I_c$ is limited by a drop of chemical reactivity, the predetermined current $I_0$ cannot be supplied before the battery 4 warms up. Where the time until a state wherein the predetermined current $I_0$ can be supplied is established is represented by $T_{idl}$, the time $T_{idl}$ increases as the battery temperature C drops. Therefore, in the embodiment described above, the battery temperature C at the time of starting of the charge is referred to upon calculation of the maximum charging time $T_{max}$.

Accordingly, where the configuration wherein the time obtained by adding predetermined time set in advance to the estimated time $T_{est}$ is set as the timeout time $T_{out}$ is adopted, upon calculation of the estimated time $T_{est}$, the estimated time $T_{est}$ should be corrected in accordance with the battery temperature C. This makes it possible to correct the timeout time $T_{out}$ in accordance with the battery temperature C similarly as in the embodiment described hereinabove.

Further, the width of the timeout region in FIG. 5 may be fixed irrespective of the value of the current I or may be varied in response to the value of the current I. The timeout region may be set, at least in a region in which, when normal constant-current and constant-voltage charge is carried out, it becomes overcharge due to variation with time of the current (region on the right upper side with respect to the graph of the current I in FIG. 5).

Further, while, in the embodiment described above described above, the battery controlling apparatus of the present invention is applied to the electric car 10, it can be applied suitably to any vehicle which incorporates a chargeable secondary battery such as a hybrid electric vehicle (HEV) and a fuel cell vehicle (FCV) and can be suitably used as a controlling apparatus for lithium-ion-based general secondary batteries by which constant-current and constant-voltage charging control is carried out.

Further, while, in the embodiment described above, charging control where the battery 4 is charged with power supplied from a household power supply is used as an example, the charging control by the battery controlling apparatus of the present invention is not limited to this, but also it is possible to apply it to the charging control in the boost charge.

The invention claimed is:

1. A battery controlling apparatus for a vehicle for carrying out constant current control for charging a battery incorporated in a vehicle to a predetermined voltage with fixed current and thereafter carrying out constant voltage control for charging the battery while maintaining the predetermined voltage and reducing the current, comprising:
   an SOC calculation section adapted to calculate a charging rate of the battery upon starting of the constant current control;
   an elapsed time measurement section adapted to measure elapsed time from starting time of the constant current control;
   a timeout setting section adapted to set a timeout period of the constant current control based on the charging rate calculated by said SOC calculation section; and
   a current cutoff section adapted to cut off the current to be supplied to the battery when the elapsed time measured by said elapsed time measurement section upon the constant current control exceeds the timeout period set by said timeout setting section.

2. The battery controlling apparatus for a vehicle as claimed in claim 1, wherein said timeout setting section calculates a period by subtracting offset time set based on a current value in the constant current control from maximum charging time set based on the charging rate, and sets the period as the timeout period.

3. The battery controlling apparatus for a vehicle as claimed in claim 1, wherein said timeout setting section calculates a period by adding predetermined time set in advance to estimated time from a point of time of the starting of the constant current control to another point of time at which the voltage of the battery reaches the predetermined voltage in the constant current control, and sets the period as the timeout period.

4. The battery controlling apparatus for a vehicle as claimed in claim 1, wherein said timeout setting section extends the timeout period in response to the current value upon the constant voltage control, and
   said current cutoff section cuts off the current to be supplied to the battery when the elapsed time measured by said elapsed time measurement section upon the constant voltage control exceeds the timeout period extended by said timeout setting section.

5. The battery controlling apparatus for a vehicle as claimed in claim 1, further comprising:
   a battery temperature detection section adapted to detect temperature of the battery upon starting of the charging, wherein
   said timeout setting section corrects the timeout period in response to the temperature detected by said battery temperature detection section.

6. The battery controlling apparatus for a vehicle as claimed in claim 2, wherein said timeout setting section extends the timeout period in response to the current value upon the constant voltage control, and
   said current cutoff section cuts off the current to be supplied to the battery when the elapsed time measured by said elapsed time measurement section upon the constant voltage control exceeds the timeout period extended by said timeout setting section.

7. The battery controlling apparatus for a vehicle as claimed in claim 3, wherein said timeout setting section extends the timeout period in response to the current value upon the constant voltage control, and
   said current cutoff section cuts off the current to be supplied to the battery when the elapsed time measured by said elapsed time measurement section upon the constant voltage control exceeds the timeout period extended by said timeout setting section.

8. The battery controlling apparatus for a vehicle as claimed in claim 2, further comprising:
   a battery temperature detection section adapted to detect temperature of the battery upon starting of the charging, wherein
   said timeout setting section corrects the timeout period in response to the temperature detected by said battery temperature detection section.

9. The battery controlling apparatus for a vehicle as claimed in claim 3, further comprising:
   a battery temperature detection section adapted to detect temperature of the battery upon starting of the charging, wherein
   said timeout setting section corrects the timeout period in response to the temperature detected by said battery temperature detection section.

10. The battery controlling apparatus for a vehicle as claimed in claim 4, further comprising:
    a battery temperature detection section adapted to detect temperature of the battery upon starting of the charging, wherein
    said timeout setting section corrects the timeout period in response to the temperature detected by said battery temperature detection section.

* * * * *